United States Patent [19]

Buzzard et al.

[11] Patent Number: 4,535,454
[45] Date of Patent: Aug. 13, 1985

[54] MULTIFREQUENCY TONE DISTRIBUTION USING A CONFERENCING ARRANGEMENT

[75] Inventors: Clair A. Buzzard, Lincroft; Kent V. Mina, Colts Neck, both of N.J.

[73] Assignee: AT&T Information Systems Inc., Holmdel, N.J.

[21] Appl. No.: 532,313

[22] Filed: Sep. 15, 1983

[51] Int. Cl.³ .............................. H04J 3/12; H04J 3/16
[52] U.S. Cl. .................................. 370/110.2; 370/62; 370/89; 370/110.3
[58] Field of Search .......... 179/18 BC; 370/62, 110.1, 370/110.2, 110.3, 89, 85

[56] References Cited

U.S. PATENT DOCUMENTS

| 4,071,711 | 1/1978 | Beaupie et al. | 370/110.1 |
| 4,125,877 | 12/1978 | Reinert | 365/190 |
| 4,211,895 | 7/1980 | Davis et al. | 179/18 J |
| 4,227,248 | 10/1980 | Munter | 370/110.2 |
| 4,327,436 | 4/1982 | Ohara et al. | 370/110.1 |
| 4,389,720 | 6/1983 | Baxter et al. | 370/62 |
| 4,393,496 | 7/1983 | Zeitraeg | 370/62 |
| 4,399,535 | 8/1983 | Southard | 370/110.2 |
| 4,460,806 | 7/1984 | Canniff et al. | 370/110.3 |
| 4,475,189 | 10/1984 | Herr et al. | 370/62 |

Primary Examiner—Douglas W. Olms
Assistant Examiner—Curtis Kuntz
Attorney, Agent, or Firm—Frederick B. Luludis

[57] ABSTRACT

There is disclosed a multifrequency tone distribution arrangement for a communication system having a common time division multiplexed bus in which digital samples of tone frequencies are supplied from a central signal generating circuit to system port circuits via selected time slots. Each port circuit automatically accepts selected signals from the common bus for conferencing to produce multifrequency digit tones and service tones.

14 Claims, 4 Drawing Figures

MULTIFREQUENCY TONE DISTRIBUTION USING A CONFERENCING ARRANGEMENT

TECHNICAL FIELD

This invention relates to a tone distribution system for a time division multiplexed business communication system of a distributed processor architecture.

BACKGROUND OF THE INVENTION

Communication systems respond to control signals in order to establish connections between terminals and, in turn, supply control signals to a user as a means of alerting the user as to the status of a connection. For example, a communication system user recognizes busy tone as an indication that a called terminal is not available. Control signals can either represent digits, such as rotary dial digits or multifrequency tone digits, or service signals such as busy tone or all paths busy tone.

In the stored program controlled business customer system call processing time is lost connecting a multifrequency generator to a line for the purpose of applying either call progress or call alerting tones to a line. Typically, time is consumed establishing a connection between the line and the selected port of the multifrequency generator. The time consumed in establishing a connection during period of few calls presents no problem, however, during busy hours the accummulation of lost time becomes appreciable. Moreover, this problem is aggravated when the demand for multifrequency tones exceeds the capacity of the tone generator. A viable but expensive solution to the problem is to provide a sufficient number of multi-tone generators to satisfy worst case call processing needs.

Further, a multi-tone generator or oscillator is typically arranged to provide only a fixed number of tones or frequencies. If future services or features require a new tone, then the generator would have to be modified to provide the additional tone.

Prior digital communication system attack the problem by distributing premixed MF tones during assigned time slots of a system time division bus to system port circuits. These prior tone distribution systems use 10 time slots to provide digit tones that are used for telephone number generation and also use 2 time slots for distributing the star (*) and gate (#) signals. Such systems, under control of the central processor, switch the trunk or port circuit through a sequence of time slots for telephone number and special services generation.

Such use of a time division bus is inefficient in its use of system time slots which, if not carrying tone signals, could be assigned to call processing. Further, if future requirements are needed for the permanent assignment of additional tones to particular time slots, the efficiency of the bus would be further degraded.

Accordingly, a need exists in the art for a tone distribution system which readily satisfies future growth and one which uses a minimum amount of time slots and call processing real time.

SUMMARY OF THE INVENTION

In accordance with our invention, each component of call progress tones and digit tones are distrubited from a central frequency generator to all port circuits via a system time division bus. Frequencies which have a high probability of use, such as digit tone frequencies, are assigned consecutive permanent time slots whereas frequencies which are not frequently used are assigned time slots as required by a central processing unit. Port circuits are notified by a central call processing unit during system initialization of the starting time slot of the consecutive series of frequency time slots which make up tone digits. This information is stored in memory associated with a port circuit. Thereafter, upon receiving a telephone number from the central call processing unit, a port circuit automatically translates each digit of the telephone number and addresses the local memory to obtain the time slot addresses of the components frequencies which make up the tone digits representative of the telephone number. The port circuit then automatically selects the appropriate frequency time slots and automatically mixes or conferences the digital components together to generate each digit tone for telephone number generation. In this manner, no central processing time is used in most cases for tone distribution thereby greatly reducing call processing time required for tone distribution.

BRIEF DESCRIPTION OF THE DRAWING

The operation and implementation of the present invention will be more fully apparent and understandable from the following description of the drawing, in which.

DETAILED DESCRIPTION

Figure 1:
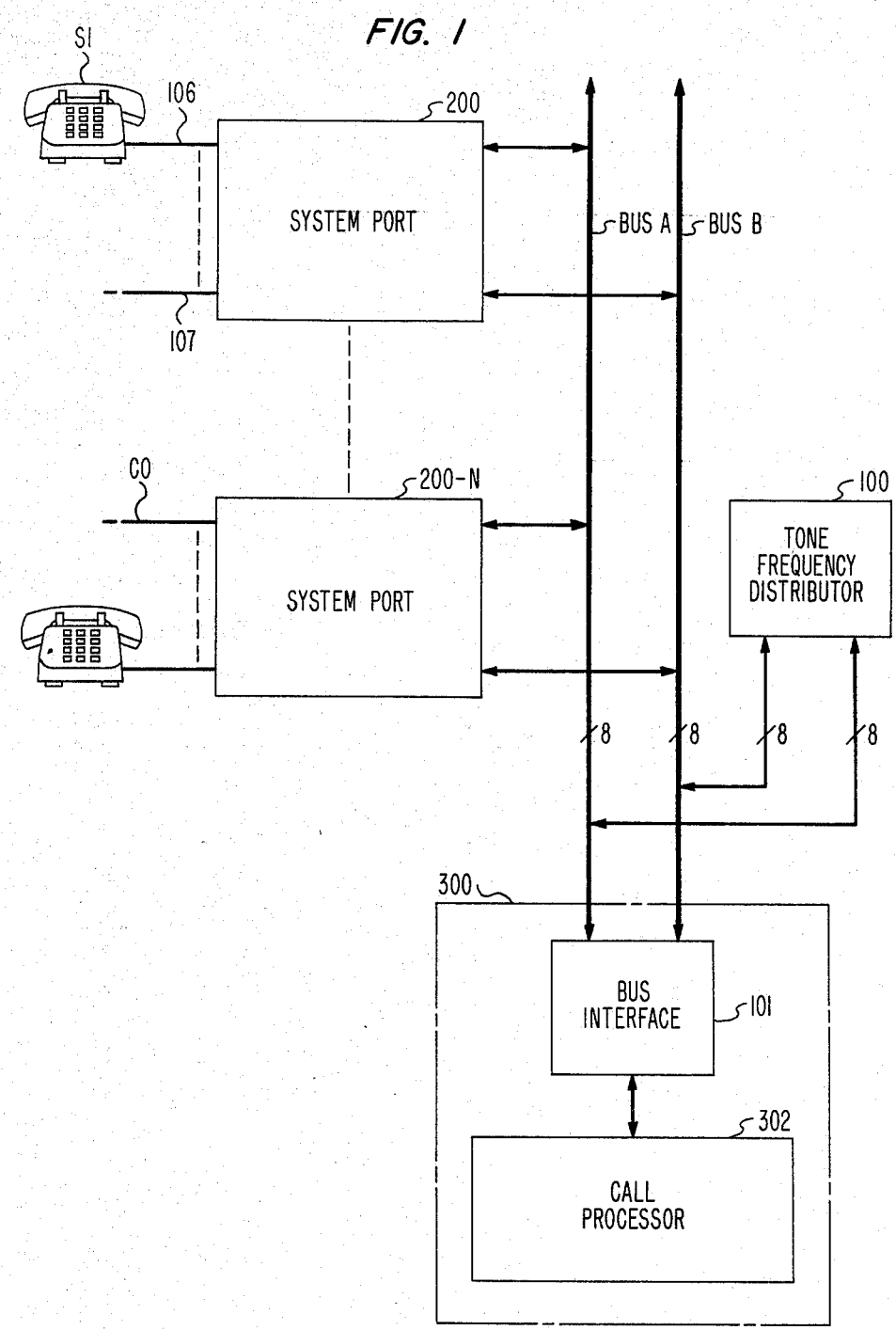
FIG. 1 is a block diagram of a business communication system.

FIG. 1 illustrates a business communication system in which system port circuits, such as system port 200 and system port 200-N, serve a number of stations and central office lines. The system port circuits are connected to a dual bus digital system having bus A and bus B with common system control 300. Bus A and bus B are time division multiplexed busses arranged to provide a plurality of time slots such as 256 time slots within a system frame of 125 microseconds. Call processor 302 operates to take in stimuli from stations via the port circuits and to control communications between stations and/or lines by assigning appropriate time slots to each connection. Call processor 302 (central processor) provides control information to the system ports indicative of the identity of the time slots which must be combined for a given conference. A conference may be of the type which conferences voice signals or frequency components which make up tone digits and call progress tones.

A clock circuit (not shown) supplies to each system port circuit 200 and to tone distributor 100 a system frame pulse approximately every 125 microseconds and a 2.048 megahertz clock signal (shown in FIG. 4) to synchronize system circuits with system bus A and bus B.

As is well known in the art, multifrequency digits are made up by combining or conferencing two frequencies from a group of seven frequencies starting at 697 Hz and ending at 1477 Hz. In some applications, such as military applications, an eighth frequency of 1633 Hz is also included in the group of frequencies which make up multifrequency tone digits. Thus, tone frequency distributor 100 normally uses seven consecutive time slots (eight time slots for military applications) for the deployment of seven digitized frequency samples which are accepted by system port circuits, such as system port circuit 200, for generating telephone numbers and service signals, such as the star (*) and gate (#) signals. Tone distributor 100 also distributes to bus A or bus B signals which make up service tones, for example, busy or reorder tone which is made up from digitized component frequencies representative of 620 Hz and 480 Hz.

As mentioned, digitized frequency samples making up tone digits are distributed by tone distributor 100 to either bus A or bus B during a series of consecutive time slots as assigned by call processor 302. The assignment of these time slots are supplied to each system port, such as system port 200, by call processor 302 during a system initialization and are stored in a block of memory (not shown) associated with each system port. In this manner, a port circuit automatically removes digitized frequency components from system bus A or system bus B for generating tone digits. Thus, for telephone number generation, call processor 302 only needs to pass a telephone number to a system port in order to have that telephone number automatically generated at that port.

Figure 2:
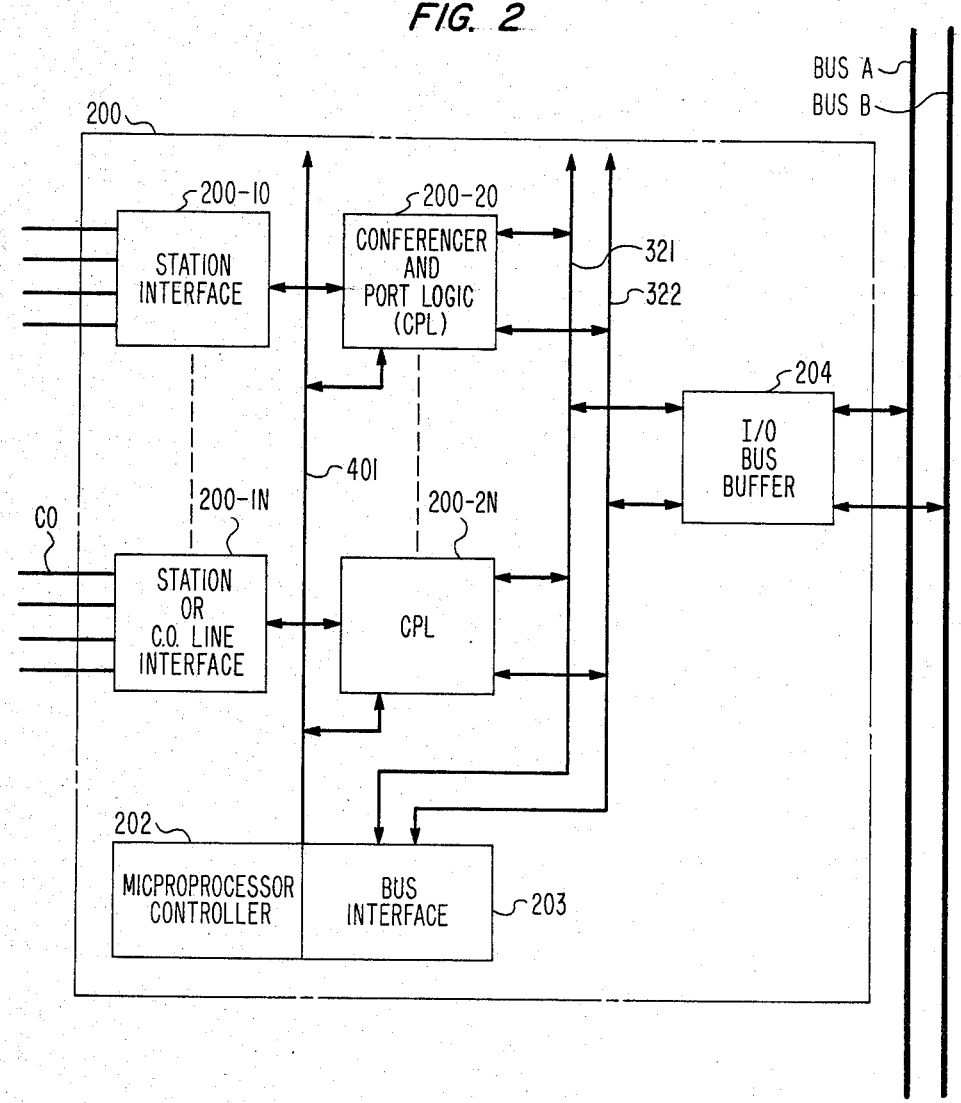
FIG. 2 is a block diagram of a system port circuit.

The system port shown in FIG. 1 has been expanded in FIG. 2 to more particularly show the circuit elements. Bus buffer 204 interfaces system port circuits with the high fan out system buses A and B. The Conferencer and Port Logic Circuits (CPL), such as CPL 200-20, processes and controls the signals between the stations and the buffered buses 321, 322. The CPLs transmit signals from each of the stations onto either of the two buses, bus A or bus B, and receive signals for each station from either bus. The CPLs operate to perform a distributed conferencing function as disclosed in U.S. Pat. No. 4,389,720 to Baxter et al, filed Apr. 23, 1981, which is incorporated herein by reference as if that application was fully set forth herein.

Typically, the higher frequency component of a multifrequency signal pair has a larger gain than the lower frequency component of the signal pair. Thus, the CPLs are also arranged to apply a gain adjustment value to a digitized frequency component removed from system bus A or system bus B as disclosed in the Baxter et al application. For example, a gain of 0 db can be applied to the lower frequency component and a gain of 1 db can be applied to the higher frequency component of a signal pair making up a multifrequency signal, such as a digit tone.

In FIG. 2 there is also illustrated microporcessor 202 and bus interface 203. Microprocessor 202 assigns transmit and receive time slots to each of the CPLs over bus 401. Bus interface 203 allows microprocessor 202 to communicate over either bus 321 or bus 322 via bus A or bus B with call processor 302 via bus interface 101 (FIG. 1). The two buses designed into the illustrated system can be used to double the capacity of the system. Each bus runs at a system sampling rate of 2.048 MHz allowing 256 time slots per bus. Having two buses allows up to 512 time slots but the use of two buses is not required for the invention disclosed herein.

In operation, a central office telephone number outputted from a station set, such as station S1, is received by call processor 302 via system port 200 and either system bus A or bus B. (FIG. 1). The telephone number is passed from call processor 302 (FIG. 1) to controller 202 via either system bus A or bus B and bus interface 203. Controller 202 stores the telephone number in associated memory (not shown) and translates each telephone digit into system bus time slots addresses and gain adjustments which are passed to a CPL, such as CPL 200-2N. CPL 200-2N automatically removes the digital frequency samples making up a telephone digit from either system bus A or bus B, applies the passed gain adjustment to the sample, and conferences the samples for distribution via line CO. Each digit of the telephone number is generated in the same manner and each digit is transmitted to a local CO for an appropriate duration.

The provision of call progress tones or service tones is arranged in a similar manner. Call processor 302 upon recognizing that a service tone, such as busy tone, needs to be transmitted to a station, such as station S1 of FIG. 1, notifies controller 202 and tone distributor 100 as to which time slots the frequency component samples making up that tone are assigned to. Controller 202 thereafter directs CPL 200-20 to remove the samples from either system bus A or bus B during the assigned time slots for conferencing. A CPL continues to conference the assigned time slots until a station on-hook stimulus is received by call processor 302. Upon receiving such a stimulus call processor 302 (FIG. 1) notifies controller 202 to disconnect from the assigned time slots making up busy tone. Call processor 302 has the option of disconnecting distributor 100 from the busy tone time slots based on whether other stations require the same service tone.

Interruption of a service tone, such as busy tone, can be programmed to occur either at a system port, such as system port 200, or at frequency distributor 100. For example, at a system port a CPL can repeatedly connect and disconnect to tone time slots to provide the interruption function. However, this method consumes controller 202 call processing time. Therefore, interruption of service tones, such as reorder and busy tone, should be provided at tone frequency distributor 100.

Figure 3:
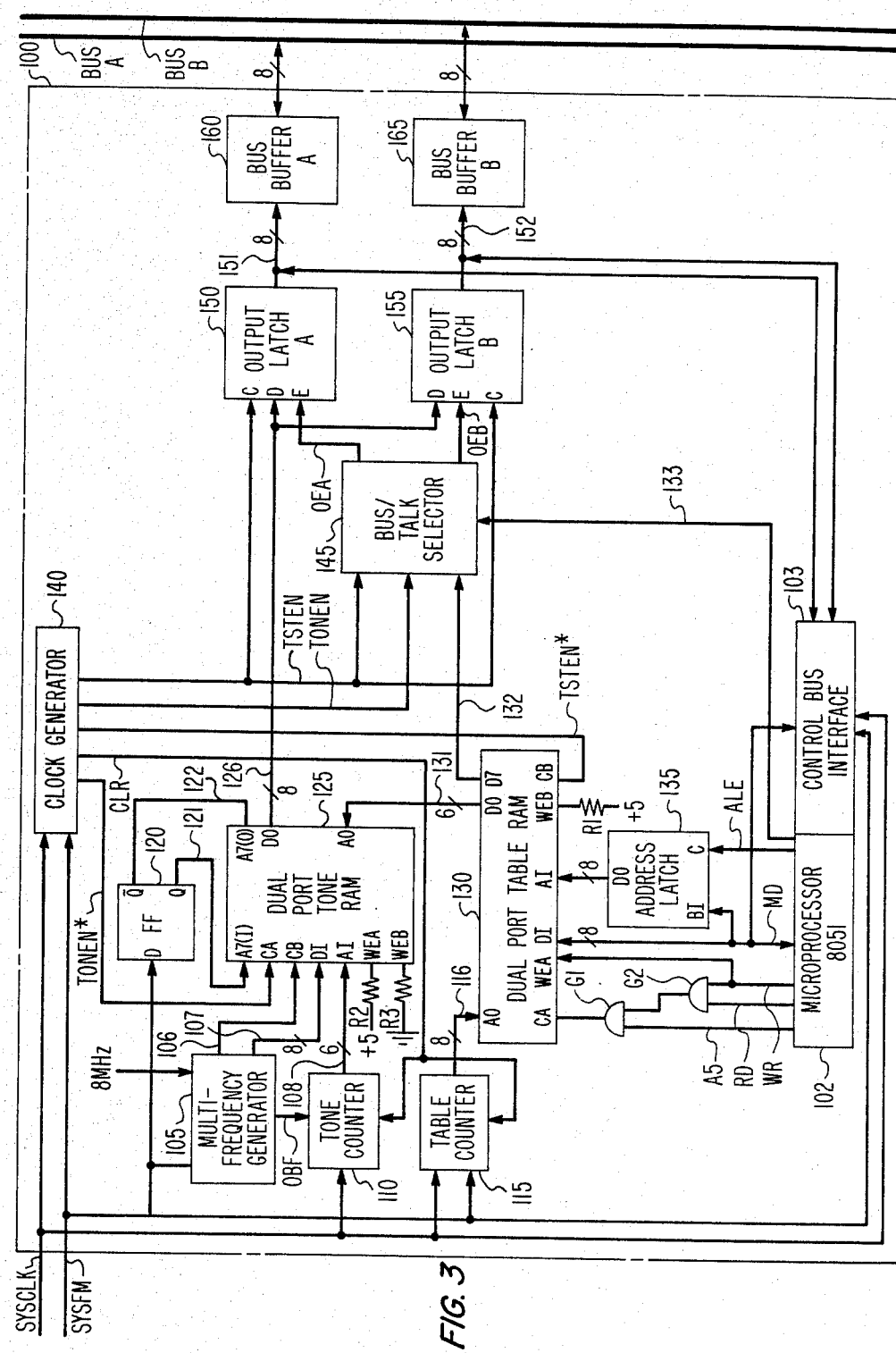
FIG. 3 is a detailed block diagram of a tone frequency distributor.

Referring now to FIG. 3, there is shown a detailed block diagram of frequency distributor circuit 100 in which a system frame pulse defining a 125$\mu$sec system frame is supplied to circuit 100 via lead SYSFM. The system frame pulse supplied to a circuit 100 clock circuit (not shown) is used to synchronize time slot addresses generated by table counter 115 with system time slots occurring on system bus A or system bus B. However, in this instance, the time slot addresses generated by table counter 115 precede system time slots by one time slot. This function allows frequency distributor 100 to preprocess digital frequency samples assigned to particular system time slots and present the frequency samples to system bus A or system bus B during the proper time slot. In this manner, propagation delays and signal processing delays through distributor 100 are offset.

Table counter 115 in response to a system frame signal SYSFM supplied via lead SYSFM and in response to a system clock signal of 2.048 MHz supplied via lead SYSCLK generates 256 sequential binary addresses starting with address 0 and ending with address 255. As discussed, the digital output from counter 115 via 8 bit bus 116 precedes the system address time slot by one time slot. As shown in FIG. 3, the digital output from counter 115 connects to dual port table RAM via bus 116. Dual port table RAM 130 is a random access memory of 256 rows of 8 bits each. RAM 130 can be addressed simultaneously at 8 bit input AI or 8 bit output AO. Data into the out of RAM 130 occurs at 8 bit input port DI and at 8 bit output port DO, respectively. As shown, only 6 bits of data are outputted from RAM 130 via output bus 131 while a seventh bit is outputted via output D7 to selector 145 via lead 132.

Either dual port table RAM 130 or dual port tone RAM 125 can be of the type disclosed in an article entitled "RAM Based Multiplexer Systems Can Save Big Chunks of Hardware", published in *Electronic Design* 19, Sept. 13, 1978, starting at page 124, or the dual port access memory storage cell disclosed in the U.S. Pat. No. 4,125,877, issued on Nov. 14, 1978, to John R. Reinert.

RAM 130 is used as a control RAM for storing dual port tone RAM 125 addresses. As will be discussed, dual port tone RAM 125 is used for the storage of digital components corresponding to digit tones and service tones generated by multifrequency digital generator 105. RAM 130 supplies dual port tone RAM 125 output addresses via 6 bit bus 131 whereas time slot addresses are supplied by table counter via lead 116. In this manner, a digital component stored in dual port tone RAM 125 is distributed to either system bus A or system bus B with respect to the time slot address generated by table counter 115. For example, assume that the digital component representing 697 Hz generated by multifrequency digital generator 105 is stored in address location 5 of dual port tone RAM 125 and that signal component is to be outputted to system bus A or system bus B during time slot 36. System control 300 loads address 5 into address location 35 of RAM 130 via microprocessor 102. Address 5 is loaded into address location 35 of RAM 130 rather than location 36 to provide prefetching of the 697 Hz digital signal in order that that signal may be supplied to system bus A or system bus B at the proper time, that is, during time slot 36.

The write enable input WEB to RAM 130 connects to +5 volts to prevent data from being written into RAM 130 via address port A0 and data ports D0 and D7. The write enable input WEA of RAM 130 is controlled by microprocessor 102, which can be typically Intel Microprocessor 8051. The interface between microprocessor 102 and RAM 130 operates in accordance with the protocol established for the Intel 8051 microcomputer described in the 1981 Intel Component Catalog at pages 5-23 and 5-35. Briefly, microprocessor 102 outputs via bus MD a RAM 130 memory location address which is accepted by latch 135 when enabled by microprocessor 102 via the ALE lead. Microprocessor 102 can then read or write into the address location stored in address latch 135 by enabling either lead RD or WR and lead A5. With lead WR enabled, RAM 130 inputs WEA and CA are enabled and the data outputted by microprocessor 102 via 8 bit bus MD is strobed into RAM 130 via port DI and stored in a location defined by the address stored in latch 135. In a like manner, microprocessor 102 can read a RAM 130 location by placing the address for that location on bus MD, enabling lead ALE and enabling lead RD and lead A5, which produces a strobe pulse at the output of gate G1 connecting to the strobe input CA of RAM 130. The RAM 130 location defined by the address stored in latch 135 is read and the data from that location is outputted via input 8 bit port DI to bus MD. Thus control 300 shown in FIG. 1, controls via microprocessor 102 which digital component is outputted to either bus A or bus B during a particular time slot by writing the RAM 125 storage location of that signal into RAM 130 at a RAM 130 location corresponding to the desired time slot minus one.

Multifrequency generator 105 is a plurality of digital sinusoidal oscillators for generating a plurality of individual consecutive samples of digitized single frequency signals making up digit tones, service tones and call process tones during each system frame. The digital sinusoidal oscillators can be of the type described in an article by K. Furuno et al entitled "Design of Digital Sinusoidal Oscillators With Absolute Periodicity", published in *IEEE Proceedings 75 ISCAS*. Generator 105 is also arranged to output a pulse via lead OBF to tone counter 110 upon generating each digitized frequency sample. Multifrequency generator 105 is clocked by a 8 MHz clock as shown in FIG. 3 and is controlled by the system frame pulse inputted via lead SYSFM. Each digital frequency sample generated by circuit 105 is outputted via 8 bit bus 107 to the DI input of dual port tone RAM 125.

Tone counter 110 is a binary counter for counting each pulse outputted by multifrequency generator 108 via lead OBF upon generating a digital frequency sample. The binary count or address generated by tone counter 110 is supplied to tone RAM 125 address port AI via address bus 108. Thus, each digital sample generated by multifrequency generator 105 is stored in consecutive dual port tone RAM 125 memory locations, in which each digital frequency sample storage location corresponds to the address outputted by tone counter 110 via 6 bit bus 108.

Accordingly, call processor 302 (FIG. 1) is programmed to know the RAM 125 memory location in which each digital frequency sample produced by generator 105 is stored. For example, a table or translation map (not shown) could be easily constructed in call processor 302 memory (not shown) for storing each frequency that is produced by generator 105 and its corresponding RAM 125 memory location. In this manner, call processor 302 translates a particular tone into RAM 125 memory locations which it stores in table RAM 130 memory locations via microprocessor 102.

Generator 105 also generates a strobe pulse supplied to dual port RAM 125 via lead 106. Since the write enable terminal WEB of RAM 125 is connected to system ground via resistor R3 multifrequency generator 105 writes a digital frequency sample into tone RAM 125 upon producing that sample. In this manner, frequency generator 105 operates in response to the 8 MHz clock pulse inputted to multifrequency generator 105 and operates in response to a system frame pulse occurring every 125 microseconds for restarting multifrequency generator 105 to produce a new series of digital frequency samples.

Dual port tone RAM 125 is similar to table RAM 130 except that the number of memory locations in tone RAM 125 needs only to be twice the number of digital samples generated by frequency generator 105 during a system frame. Tone RAM 125 is operated in a ping-pong manner in which during a first frame frequency generator 105 writes digital samples into the lower half to tone RAM 125 memory locations and writes digital samples into the upper half of tone RAM 125 memory locations during a next frame. Digital samples are read out of tone RAM 125 in a manner opposite to that of frequency generator 105. Thus, while generator 105 is writing into the lower half of tone RAM 125 digital samples are read out of the upper half of RAM 125.

As shown in FIG. 3, flip-flop 120 is used to operate tone RAM 125 in a ping-pong manner. Flip-flop 120 is pulsed each frame by the system frame clock inputted via lead SYSFM causing flip-flop 120 to change state at the beginning of each system frame. The Q output from flip-flop 120 connects to bit 7 of tone RAM 125 input address while ouput $\overline{Q}$ of flip-flop 120 connects to bit 7 of the output address of tone RAM 125. Thus, the outputs from flip-flop 120 are complemented each system frame causing the input write address to change from the lower half to the upper half to tone RAM 125 and concurrently changing the output read address from the upper half to the lower half, respectively.

The output write enable WEA of tone RAM 125 is continuously connected to +5 volts via resistor R2 to prevent data from being written into tone RAM 125 via port D0 and address port A0. As mentioned, for each time slot table RAM 130 supplies to tone RAM 125 an address via 6 bit bus 131 which is combined with the address bit outputted from flip-flop 120 via lead 122. The address inputted to port A0 of tone RAM 125 in combination with the bit inputted via lead 122 causes a memory location represented by that address to be read and the contents of that location outputted via 8 bit bus 126 to 8 bit output latches A and B.

Clock generator 140 is a combinational circuit for producing a series of clock signals (FIG. 4) to coordinate a particular digital frequency sample unloaded from tone RAM 125 with a particular system time slotC occurring on system bus A and system bus B. Clock generator 140 supplies a strobe pulse via lead TONEN* to the CA port of tone RAM 125 which causes a RAM 125 memory location defined by the address supplied by table RAM 130 via bus 131 to port A0 of tone RAM 125 plus the input to port A7 via lead 122 to be read and the data stored in that location to be outputted via 8 bit bus 126.

Bus and talk selector circuit 145 is a combinational circuit for selecting either system bus A or bus B for the transmission of a digital frequency sample outputted by tone RAM 125 via 8 bit bus 126. Bus talk selector circuit 145 is controlled by microprocessor 102 via lead 133 and bit 7 of each data work outputted by table RAM 130 via lead 132 to selector 145.

Lead 133 from microprocessor 102 directs selector 145 as to system bus selection, i.e., selection of system bus A or system bus B, and bit 7 inputted via lead 132 directs selector 145 as to whether a digital frequency sample is to be outputted during a respective time slot. In the event a digital sample is not to be outputted during a particular time slot lead 132 will be at a logic 0 state causing selector 145 to disable output latches 150 and 155 via leads OEA and OEB, respectively. Lead 132 from RAM 130 at logic one state in combination with lead 133 from microprocessor 102 at a logic zero state causes selector 145 to enable latch 150 via lead OEA thus selecting system bus A. Lead 133 at a logic zero state with lead 132 at a logic one state causes selector 145 to enable latch 155 via lead OEB.

Alternatively, bit 6 of each data word stored in RAM 130 could be used advantageously in place of lead 133 from microprocessor 102 for bus A or bus B selection. In this manner, bus selection could be adaptively connected with a particular digital sample to be outputted via system bus A or bus B thereby increasing the efficiency in which the system busses are used.

Output latch 150 and output latch 155 are 8 bit latch circuits for latching the output from tone RAM 125 via bus 126 and presenting that data to either bus buffer 160 or bus buffer 165 via 8 bit bus 152 or 153, respectively. Output latch 150 as mentioned is enabled by selector 145 and clock pulse TSTEN produced by clock generator 140. A clock pulse TSTEN causes latch 150 to output the data originating from tone RAM 125 during the designated time slot.

Bus buffer A 160 and bus buffer B 165 are comprised of 8 two-way transmission gates for buffering circuit 100 to system bus A and system bus B, respectively. Clock generator 140 is used to generate four clock signals TSTEN, TONEN, TSTEN* and TONEN* in response to the system clock and system frame signals inputted to generator 140 via leads SYSCLK and SYSFM, respectively. Clock generator 140 also generates a clear signal on the occurrence of a system frame pulse for resetting tone counter 110 and table counter 115 to synchronize the addresses generated by those counters with the system frame pulse.

Figure 4:
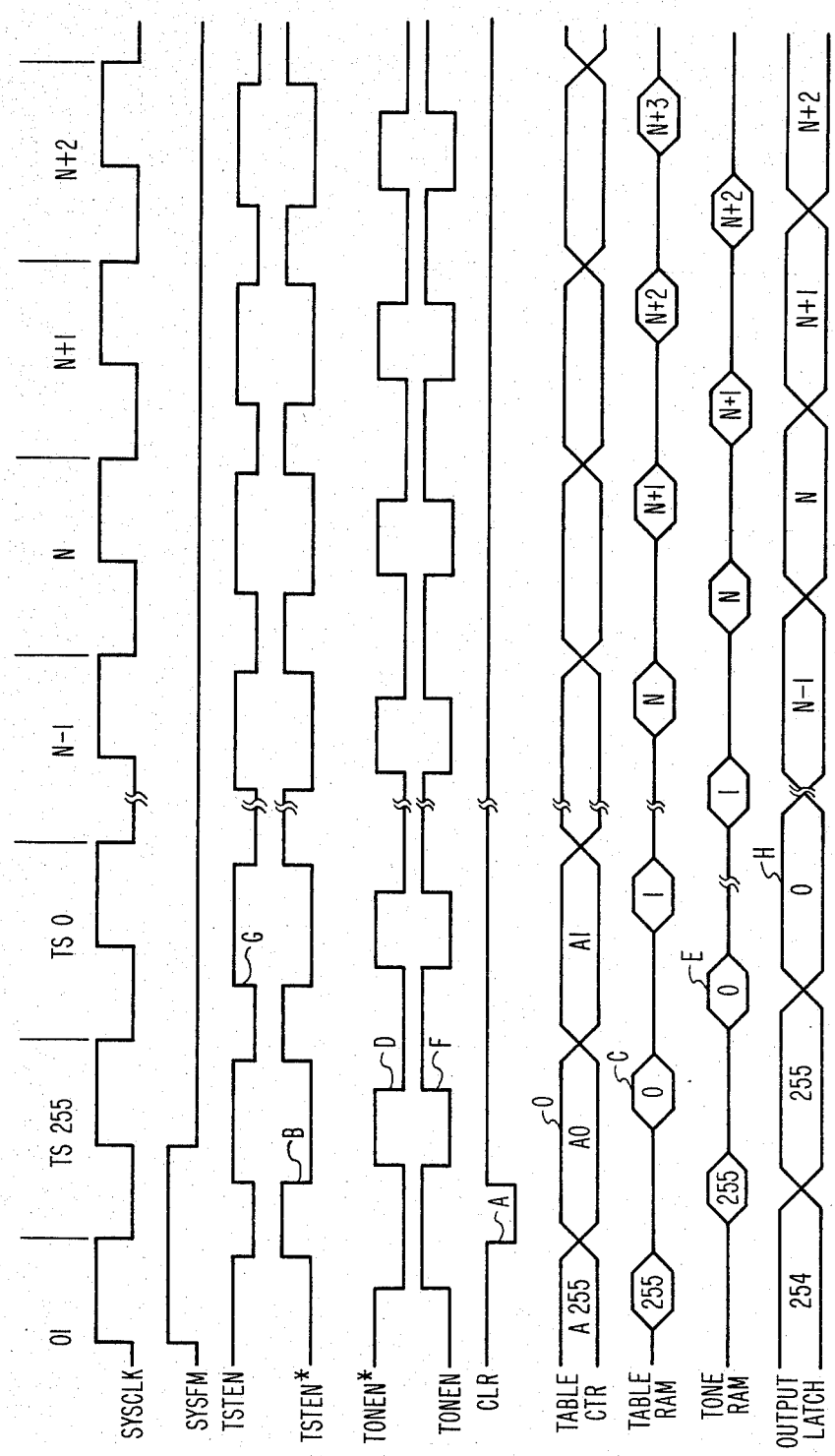
FIG. 4 is a diagram of tone frequency distributor control signals.

Referring now to FIG. 4, there is shown clock signals TSTEN and TONEN and their complements TSTEN* and TONEN*, which are produced by clock generator 140 with respect to system clock signal SYSCLK and system frame signal SYSFM. Also shown in FIG. 4 is a clear signal CLR(a) supplied by clock generator 140 for resetting table counter 115 and tone counter 110 to address 0.

FIG. 4 also illustrates a timing sequence of the operation of distributor 100 with respect to the abovementioned clock signals. The following description is made with respect to a particular digital frequency sample supplied by tone RAM 125 and which is to be supplied to either system bus A or system bus B during a system time slot, for example only time slot 0.

Referring to FIG. 4, address 0 outputted from table counter 115 (0) is clocked into RAM 130 on the falling edge clock signal TSTEN*(B). Approximately 200 nanoseconds thereafter the output from table RAM 130 representative of the information stored in memory location 0 is valid as represented by the line designated table RAM (C) in FIG. 4. The 6 bit address outputted from port D0 of table RAM 130 is clocked into the A0 port of tone RAM 125 on the falling edge of clock signal TONEN* (D). Approximately 200 nanoseconds thereafter the contents of the memory location represented by the address inputted at port A0 of tone RAM 125 is valid (E) and is outputted via port D0 of RAM 125 to output latch 150 and latch 155 via bus 126.

Referring to the rising edge of clock TONEN (F), that signal clocks bit 7 outputted by circuit 130 via lead 132 into talk selector 145. As mentioned, the logical states of bit 7 and lead 133 from microprocessor 102 directs circuit 145 to enable either latch 150 or latch 155. Still referring to FIG. 4, the rising edge of clock signal TSTEN (G) causes the output from tone RAM 125 as contained on bus 126 (E) to be clocked into output latch 150 and output latch 155. The rising edge of clock signal TSTEN (G) also causes selector circuit 145 to enable either output latch 150 or output latch 155 based on the state of lead 133 and the logic state of lead 132. Upon being enabled, latch 150 or 155 transfers the digital frequency sample outputted (H) from tone RAM 125 via bus 126 to system bus A or system bus B via bus buffer circuit 160 or 165.

Conclusion

It is obvious to one skilled in the art that the invention disclosed herein is not limited to the embodiment disclosed in the accompanying drawing and foregoing detailed description, but can be rearranged through the substitution, addition and/or deletion of components and function without departing from the scope and spirit of the invention.

For example, the frequencies making up service tones, such as busy tones or reorder tones, could be mixed prior to storage in dual port tone RAM 125, and since these tones are interrupted, the interruption rate could be emulated by a call processor directing circuit 100 to apply and remove the premixed tones to system bus A or bus B at the desired rate. Also, dual port tone RAM 125 could be two memory devices in which multifrequency generator 105 is connected to a first memory during a first frame and connected to a second memory during a second frame. In this manner, the second memory is unloaded during a first frame and the first memory is unloaded during a next frame. Also, it will be obvious that any number of time slots can be used for distribution and that the tone memory and table memory can be part of the same memory.

What is claimed is:

1. A tone distribution arrangement adapted for use in a communication system having a central processor in communication with at least one port processor via a common time division multiplexed bus of n-time slots within each of a plurality of frames of time slots, comprising
   means for generating a plurality of single frequency signals, each of said single frequency signals being a component of a predetermined plurality of multifrequency tones, and
   means for supplying each of said single frequency signals to said bus during respective ones of said time slots, said at least one port processor being adapted to form an individual one of said multifrequency tones by removing from said bus, during its respective one of said time slots, each component of said individual one of said multifrequency tones and conferencing each said removed component together.

2. The invention set forth in claim 1 wherein said single frequency signals are supplied to said bus during consecutive respective ones of said time slots.

3. The invention set forth in claim 1 wherein said generating means includes means for interrupting ones of said single frequency signals from being supplied to said bus at a predetermined interrupting rate.

4. The invention set forth in claim 3 wherein said common bus includes a first bus and a second bus and said interrupting means includes means for directing any one of said single frequency signals either to said first bus or to said second bus.

5. A multifrequency tone distribution arrangement adapted for use in a communication system of the type having a central processor in communication with at least one port processor via a common bus of n-time slots within each of a plurality of system frames of time slots, comprising
   means for generating each component of a predetermined plurality of multifrequency tones, and
   means for supplying each said component to said bus during a respective one of said time slots,
   said at least one port processor being adapted to form an individual one of said multifrequency tones by removing from said bus, during its respective one of said time slots, each component of said individual one of said multifrequency tones and conferencing each said removed component together.

6. The invention set forth in claim 5 wherein said each component of said predetermined plurality of multifrequency tones is supplied to said bus during consecutive respective ones of said time slots.

7. The invention set forth in claim 5 wherein said generating means includes,
   storage means having a plurality of memory locations, and
   means for storing each said component as it is generated in a a first half of said storage means during a first frame and for storing each said component in a second half of said storage means during a next frame.

8. The invention set forth in claim 7 wherein said means for storing includes means for interrupting each said component of individual ones of said multifrequency tones from being supplied to said bus at a predetermined interrupting rate.

9. The invention set forth in claim 8 wherein said bus includes a first bus and a second bus and said means for storing further includes means for directing each said component either to said first bus or to said second bus.

10. A multifrequency tone distribution arrangement adapted for use in a communication system in which a call processor is in communication with at least one port circuit via a common time division multiplexed bus of n-time slots occurring within each of a plurality of system frames of time slots, comprising
    means for generating a plurality of single frequency signals, each of said single frequency signals being a component of a predetermined plurality of multifrequency tones, each of said tones being associated with a respective digit,
    means for supplying each of said single frequency signals to said bus during respective ones of said time slots, and
    port circuit means responsive to a signal indicative of said respective digit for forming the associated multifrequency tone by removing from said bus, during its respective one of said time slots, each component of said associated multifrequency tone and conferencing each said removed component together.

11. The invention set forth in claim 10 wherein said generating means includes
    storage means having a plurality of memory locations for storing said single frequency signals as they are generated, and
    means for causing said single frequency signals to be stored in a first half of said storage means during a first frame and to be stored in a second half of said storage means during a next frame.

12. The invention set forth in claim 10 wherein said bus includes a first bus and a second bus and said supplying means includes means for directing individual ones of said single frequency signals either to said first bus or to said second bus.

13. The invention set forth in claim 12 wherein said supplying means further includes means for interrupting individual ones of said single frequency signals from being supplied to said bus at a predetermined interrupting rate.

14. A method of forming multifrequency tones, said method adapted for use in a communication system having a call processor in communication with at least one port circuit over a common bus of n-time slots within a frame of time slots, comprising the steps of
    generating each component of a predetermined plurality of multifrequency tones, supplying each said component to said bus during a respective one of said time slots and adapting said at least one port circuit to form an individual one of said multifrequency tones by removing from said bus, during its respective one of said time slots, each component of said individual one of said multifrequency tones and conferencing each removed component together.

* * * * *